May 25, 1965   R. A. J. GOYON   3,185,976
ADJUSTABLE CONTACTING DEVICE, PARTICULARLY FOR METERING APPARATUS
Filed June 13, 1961   2 Sheets-Sheet 1

Inventor:
René Auguste Joseph Goyon
by: George U Spencer
Attorney

United States Patent Office 3,185,976
Patented May 25, 1965

3,185,976
ADJUSTABLE CONTACTING DEVICE, PARTICULARLY FOR METERING APPARATUS
René Auguste Joseph Goyon, Massy, France, assignor to Compagnie des Compteurs, Paris, France, a company of France
Filed June 13, 1961, Ser. No. 116,853
Claims priority, application France, June 21, 1960, 830,611, Patent 1,269,134
5 Claims. (Cl. 340—266)

The present invention relates to an adjustable contacting device, particularly for metering apparatus such as relays or other similar appliances. This device is principally characterized in that it comprises at least one metal sheath, the number of sheaths being chosen according as to whether the device is provided for a maximum or minimum contact, or for two maximum or minimum contacts, these sheaths sliding on a taut wire of insulating material or on a taut metal wire covered with an insulating sheath, one of the ends of the metal sheath or sheaths being able to come into contact with a roller or flexible blade borne by the metering index, so as to close an auxiliary signalling, alarm or regulating circuit.

The attached drawing shows, by way of non-restrictive example, two forms of embodiment of the purpose of the invention.

Figure 1:
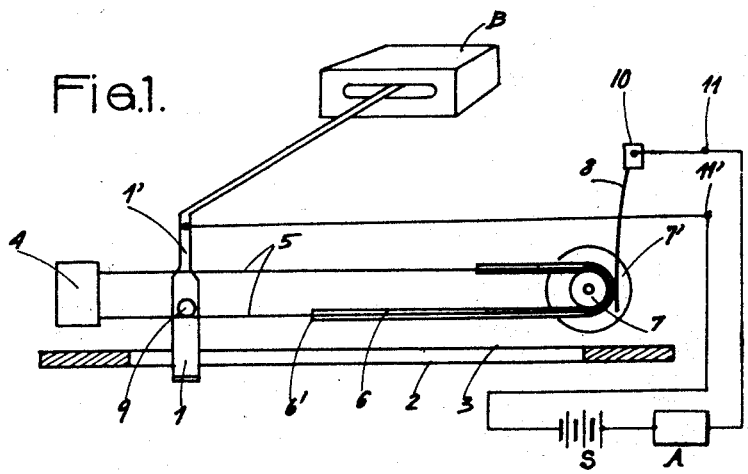
FIGURE 1 is a diagrammatical plan partly in section of a first form of embodiment of the invention.

In FIGURE 1, 1 denotes the metering index or mark, carried by a needle 1' of a metering appliance B, moving in front of a flat graduated dial 2. This dial has a longitudinal observation window 3. Behind this window is a flexible metal sheath 6 formed, for example, of a closely coiled spring, inside of which is encased a wire 5 of insulating material of any kind (nylon, for example). The metal sheath 6 is drawn along to enable it to be regulated by a grooved pulley 7, which, in the example shown, is integral with a milled wheel 7', hand controlled. Of course, the wheel 7' can have teeth at its periphery and be controlled from outside by a rod, whose end comprises a toothed wheel meshing with the wheel 7'.

The wire 5 is tied at its two ends to a block 4, preferably of insulating material, fixed inside the appliance.

8 denotes a resilient metal blade rubbing on the flexible metal sheath 6. This blade is fixed on a stud 10, insulated with regard to the appliance, and connected to a terminal 11. The second terminal 11' is connected by a flexible liaison conductor to the needle of the appliance. The terminals 11 and 11' are connected to a circuit, comprising an auxiliary source S in series, and the signalling, alarm and regulating member A.

The end of the needle 1' of the appliance comprises a mobile contact 9 which, in the example shown, is a roller sliding on the wire 5. When this roller, owing to the deviation of the needle, comes into contact with the end 6' of the metal sheath 6, it closes the circuit comprising the warning or regulating member.

The end 6' of the sheath 6 which determines the maximum value of the metering magnitude for which the warning or regulating circuit is closed, is positioned with great accuracy for it is easily visible through the window 3 of the graduated dial 2.

Figure 2:
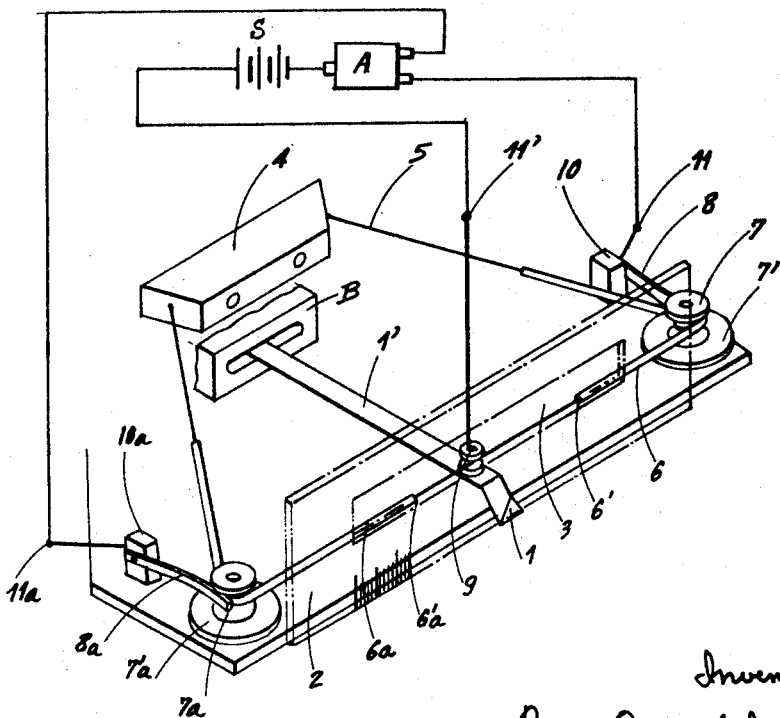
FIGURE 2 is a perspective view of an alternative.

In FIGURE 2, where the same reference numbers denote the same members as in FIGURE 1, we see on the left a metal sheath 6a whose end 6a' determines the minimum value of the measuring magnitude for which the contact must be set up. The members 7a, 7a' 8a, 10a, 11a correspond to the members 7, 7', 8, 10 of the right hand part of the figure, and which have been previously described. The external warning circuit or for signalling or regulating, has not been shown in detail, for it is well known to technicians, and can be carried out in numerous manners and does not form part of the invention. We simply indicate that the terminal 11' is connected to one of the poles of the auxiliary source S, and that the terminals 11 and 11a are respectively connected to one of the terminals of the "maximum" and "minimum" warning or regulating members A, the other terminal of these members being connected to the other pole of the auxiliary source.

Figure 3:
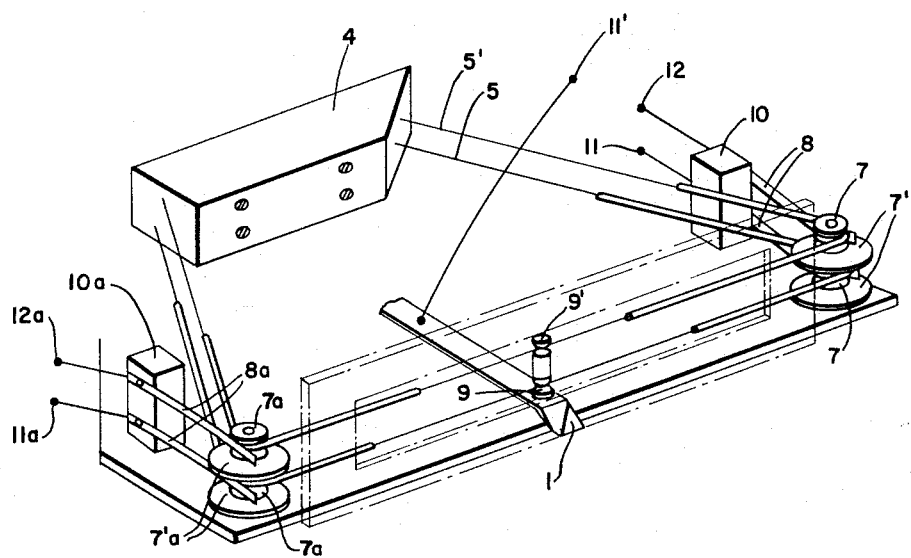
FIGURE 3 is a perspective of yet another modification.

It is easy to see that several adjustable contact devices in the same appliance can be superimposed behind the same dial, each of these devices being able to be regulated for different values of metering magnitude. Such an arrangement is shown in FIGURE 3 which is similar to that of FIGURE 2 and identifies the same parts by the same reference numerals, with additional terminals being indicated at 12 and 12a.

I claim:
1. Adjustable contacting device for metering apparatus, relays and similar appliances provided with a movable index, comprising a substantially wire-shaped member made of insulating material, a support for the two ends of said substantially wire-shaped member, a flexible conducting element fitted on said wire-shaped member but being movable with respect thereto, a pulley engaging said flexible conducting element and, through the intermediary of said conducting element, tensioning said wire-shaped member and maintaining it in close contact with said movable index of the metering apparatus, an operating member to rotate said pulley and thus to move said flexible conducting element with respect to said wire-shaped member, a signalling mechanism electrically connected to said flexible conducting element, and conductive means carried by said index for movement therewith and being electrically connected to said signalling mechanism, said conductive means being arranged to move with respect to said wire-shaped member and said flexible conducting element upon deflection of said index, in consequence of which the electric circuit incorporating said signalling mechanism is closed when said index has been deflected to a position in which said conductive means carried by said index contacts said flexible conducting element, the particular deflection of said index at which such circuit closing occurs being dependent on the particular position of said flexible conducting element with respect to said wire-shaped member.

2. A device as defined in claim 1 wherein said flexible conducting member is in the form of a sheath surrounding said wire-shaped member.

3. A device as defined in claim 1, further comprising a graduated dial having a window through which said index projects.

4. A device as defined in claim 1, further comprising a second flexible conducting element which is fitted on said wire-shaped member and is movable with respect thereto and which is electrically connected to said signalling mechanism, a second pulley engaging said second flexible conducting element, and a second operating member to rotate said second pulley and thus to move said second flexible conducting element with respect to said wire-shaped member, said conducting means of said index being arranged to coact with said second flexible conducting element in the same manner as it coacts with the first-mentioned flexible conducting element.

5. A device as defined in claim 1, further comprising a second wire-shaped member, at least one further flexible conducting element which is fitted on said second wire-shaped member and which is movable with respect thereto and which is electrically connected to said signalling mechanism, at least one further pulley engaging said further flexible conducting element and, through the intermediary thereof, tensioning said second wire-shaped member; said conductive means of said index coacting with said further flexible conducting element in the same manner as it coacts with the first-mentioned flexible conducting element.

References Cited by the Examiner

UNITED STATES PATENTS

| | | | |
|---|---|---|---|
| 1,486,576 | 3/24 | Hafer | 340—266 |
| 1,719,441 | 7/29 | Newcomb | 200—56 |
| 2,279,528 | 4/42 | Ross | 200—56 |
| 2,728,072 | 12/55 | Magid | 340—266 |
| 2,780,686 | 2/57 | Elliott | 340—266 |
| 2,825,897 | 3/58 | Kennedy | 340—266 X |

FOREIGN PATENTS

| | | |
|---|---|---|
| 460,223 | 5/28 | Germany. |
| 711,255 | 9/41 | Germany. |

NEIL C. READ, *Primary Examiner.*

BENNETT G. MILLER, *Examiner.*